(12) United States Patent
Weber et al.

(10) Patent No.: US 11,502,628 B2
(45) Date of Patent: Nov. 15, 2022

(54) ENERGY STORAGE SYSTEM

(71) Applicant: BME DR. GOLBS & PARTNER GMBH, Bautzen (DE)

(72) Inventors: Stefan Weber, Karlsruhe (DE); Petra Werner, Schirgiswalde-Kirschau (DE)

(73) Assignee: BME DR. GOLBS & PARTNER GMBH, Bautzen (DE)

( * ) Notice: Subject to any disclaimer, the term of this patent is extended or adjusted under 35 U.S.C. 154(b) by 127 days.

(21) Appl. No.: 16/756,326

(22) PCT Filed: Oct. 16, 2018

(86) PCT No.: PCT/EP2018/078250
§ 371 (c)(1),
(2) Date: Apr. 15, 2020

(87) PCT Pub. No.: WO2019/076897
PCT Pub. Date: Apr. 25, 2019

(65) Prior Publication Data
US 2020/0343833 A1    Oct. 29, 2020

(30) Foreign Application Priority Data

Oct. 16, 2017   (DE) ..................... 10 2017 124 030.6

(51) Int. Cl.
*H02N 99/00* (2006.01)
*F02G 1/043* (2006.01)
(Continued)

(52) U.S. Cl.
CPC ............ *H02N 99/00* (2013.01); *F02G 1/043* (2013.01); *F25B 21/04* (2013.01); *F28D 20/028* (2013.01);
(Continued)

(58) Field of Classification Search
CPC . H02N 99/00; F02G 1/043; F25B 2/04; F28D 20/028; H02J 3/23; H02J 3/381;
(Continued)

(56) References Cited

U.S. PATENT DOCUMENTS

| | | |
|---|---|---|
| 4,402,188 A | 9/1983 | Skala |
| 2010/0107635 A1 | 5/2010 | Tsubone |
| 2012/0227926 A1* | 9/2012 | Field ...................... F24S 60/10 |
| | | 165/10 |

FOREIGN PATENT DOCUMENTS

| | | |
|---|---|---|
| EP | 2241737 A1 | 10/2010 |
| EP | 2312129 A1 | 4/2011 |
| WO | WO-2011/058383 A2 | 5/2011 |

OTHER PUBLICATIONS

International Application No. PCT/EP2018/078250, International Search Report and Written Opinion, dated Feb. 15, 2019.
(Continued)

*Primary Examiner* — Hal Kaplan
(74) *Attorney, Agent, or Firm* — Marshall, Gerstein & Borun LLP

(57) ABSTRACT

The invention relates to an energy storage system for storing heat and coldness and for providing electrical energy, characterized by an energy converter, wherein the energy converter is designed to produce electrical energy from heat and coldness and to produce heat and coldness from electrical energy, the energy converter being in heat-transferring contact with a hot heat exchanger and with a cold heat exchanger, the hot heat exchanger being connected to a heat reservoir and the cold heat exchanger being connected to a coldness reservoir, and a control unit being provided, which operates the energy storage system in a first operating mode, in which heat and coldness are formed from electrical energy
(Continued)

Heat and cold generation and storage with electrical energy surpluses by means of the energy converter, and in a second operating mode, in which electrical energy is produced from heat and coldness.

20 Claims, 2 Drawing Sheets

(51) Int. Cl.
*F28D 20/02* (2006.01)
*H02J 3/38* (2006.01)
*H02J 15/00* (2006.01)
*H02J 3/28* (2006.01)
*F24H 7/00* (2022.01)
*F25B 21/04* (2006.01)

(52) U.S. Cl.
CPC ............... *H02J 3/28* (2013.01); *H02J 3/381* (2013.01); *H02J 15/00* (2013.01); *F24H 7/002* (2013.01); *H02J 2300/24* (2020.01); *H02J 2300/28* (2020.01); *Y02E 10/56* (2013.01); *Y02E 60/14* (2013.01)

(58) Field of Classification Search
CPC .... H02J 15/00; H02J 2300/24; H02J 2300/28; F24H 7/002; Y02E 10/56; Y02E 60/14
USPC .......................................................... 307/24
See application file for complete search history.

(56) References Cited

OTHER PUBLICATIONS

International Application No. PCT/EP2018/078250, International Preliminary Report on Patentability, dated Apr. 21, 2020.

* cited by examiner

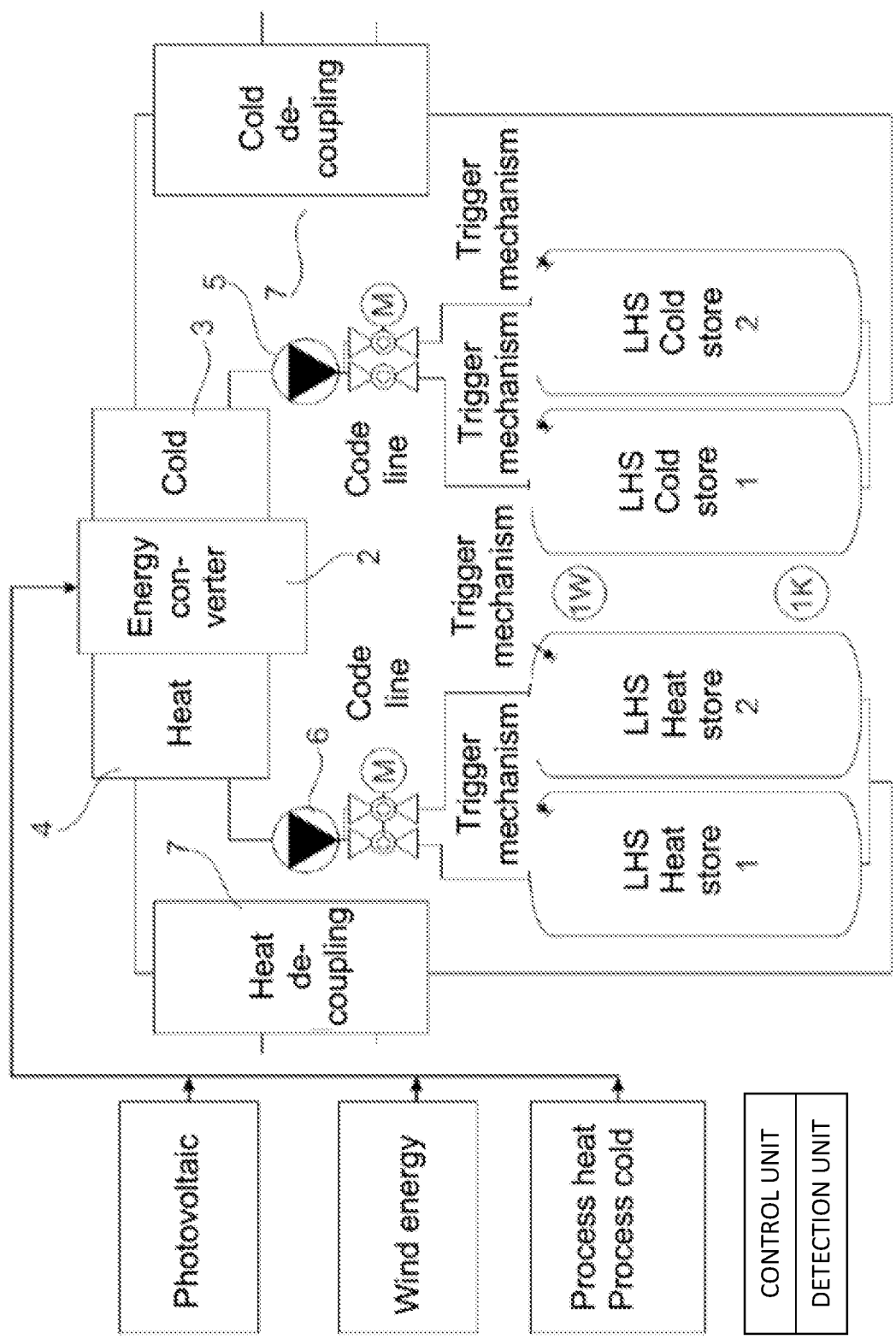
Fig. 1 Heat and cold generation and storage with electrical energy surpluses

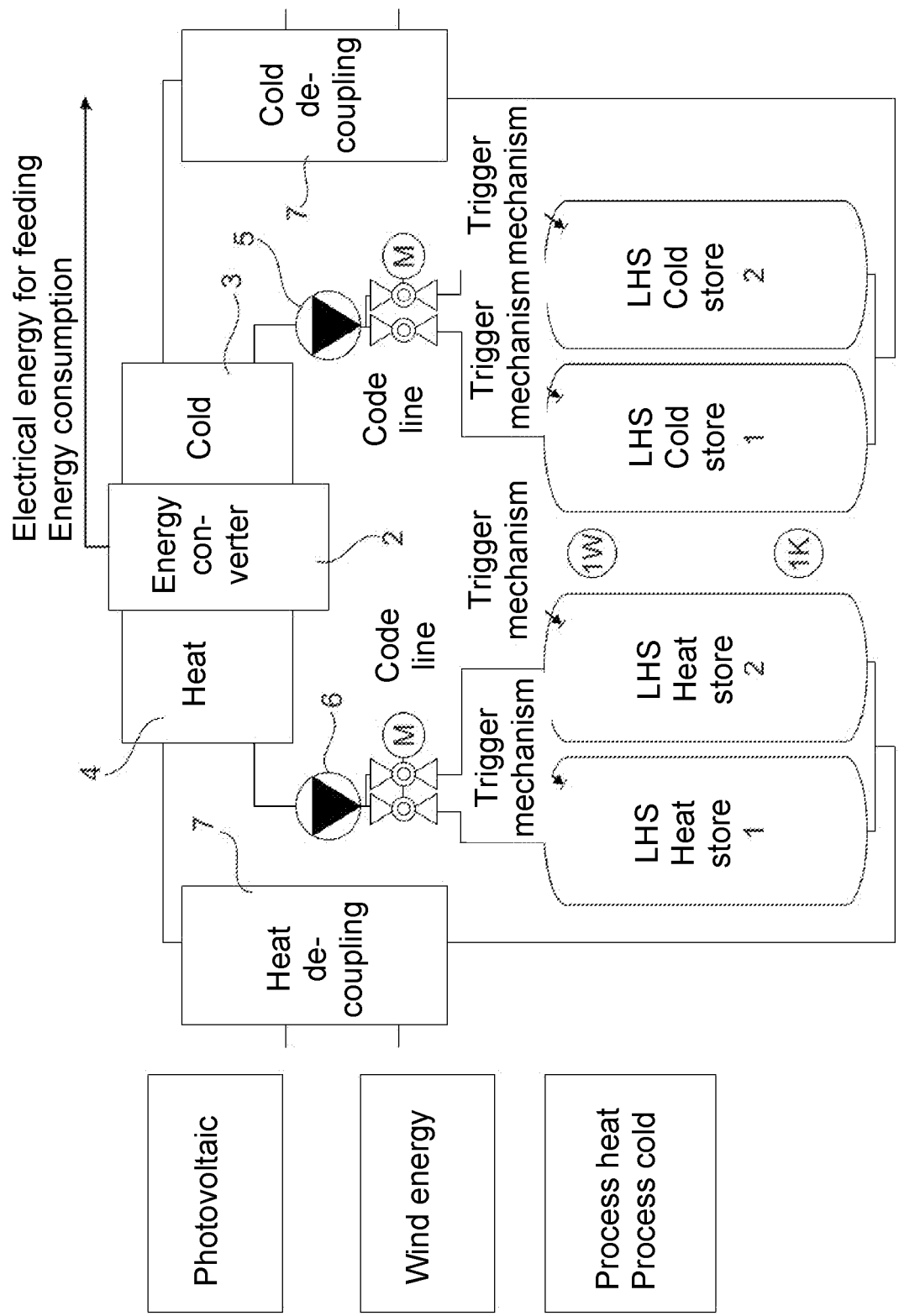
Fig. 2 Power generation from cold and heat energy

ENERGY STORAGE SYSTEM

FIELD OF THE INVENTION

The present invention relates to an energy storage system.

BACKGROUND OF THE INVENTION

It is known from the prior art to store electrical energy, for example in a battery, in the form of compressed air, or by means of a pump storage station.

It is the underlying object of the present invention to provide an energy storage system that has a greater field of application in comparison with known systems.

SUMMARY OF THE INVENTION

This object is achieved by an energy storage system having the features of claim 1.

Provision is accordingly made that the energy storage system is configured for storing heat and cold and for providing electrical energy and is characterized by an energy converter, wherein the energy converter is configured to generate electrical energy from heat and cold and to generate heat and cold from electrical energy; wherein the energy converter is in heat exchanging contact with a hot heat exchanger and with a cold heat exchanger; and wherein the hot heat exchanger is connected to a heat store and the cold heat exchanger is connected to a cold store; and wherein a control unit is provided that operates the system in a first operating mode in which heat and cold are formed from electrical energy by means of the energy converter and in a second operating mode in which electrical energy is generated from heat and cold stored in the heat store or cold store respectively.

A simple, inexpensive, and low-maintenance energy storage unit is provided by the present invention by means of which not only electrical energy can be stored in the form of heat and cold, but rather conversely electrical energy can also be provided from thermal energy. The energy storage system, that is also simply called the system in the following, is controlled by a control unit such that a first or second operating mode is selected as desired, wherein the system converts electrical energy into thermal energy in the first operating mode and converts thermal energy into electrical energy in the second operating mode.

One and the same energy converter is preferably used for both conversion processes. It is, however, also conceivable that a different energy converter is used in the first operating mode than in the second operating mode.

The energy converter is designed by way of example as a thermal generator, a heat pump, a Stirling engine, or as a thermoelectric element.

A detection unit is preferably provided that is connected to the control unit and that is configured to detect the demand for and/or the available amount of heat and/or cold and/or electrical energy, with the control unit being configured to set the first or second operating mode in dependence on this detection. If surplus electrical energy is available, for example from a photovoltaic system or from a wind turbine, this energy can be converted into heat and cold and can be stored.

In the first operating mode, the system acquires its energy from electrical energy surpluses, e.g. from wind turbines and/or from photovoltaic systems. An energy converter is switched for this purpose such that it converts electrical energy into cold and heat simultaneously. These forms of energy are then stored in respective storage units. Heat exchangers and pumps can be used for this purpose that convey a heat transfer medium, with the heat transfer medium serving the transport of thermal energy that is then ultimately stored in the heat store and cold store.

Equally, in the second operating mode, electrical energy can be generated as desired from heat or cold stored in said stores.

The storage of heat is to be understood such that thermal energy is stored at a higher temperature level (preferably >20° C.) than is the case in the storage of cold. The storage of cold is correspondingly to be understood such that thermal energy is stored at a lower temperature level (preferably <20° C.) than is the case in the storage of heat. The storage or generation of cold is thus the storage or generation of thermal energy having a smaller energy content than is the case in the storage or generation of heat.

The term "heat" and the term "cold" correspondingly respectively designate thermal energy, with the energy content of the heat being greater than that of the cold.

The hot heat exchanger and the heat store are preferably components of a preferably closed circuit in which a heat transfer medium is located that can be conveyed in the circuit by a conveying means, in particular by a pump.

The cold heat exchanger and the cold store are accordingly components of a preferably closed circuit in which a heat transfer medium is located that can be conveyed in the circuit by a conveying means, in particular by a pump.

The heat transfer medium has the task of conveying heat or cold produced in the heat exchangers into the heat store or into the cold store respectively or, conversely, to convey heat or cold from the heat store or from the cold store respectively to the heat exchangers.

It is furthermore conceivable that a heat exchanger for transferring heat or cold is located between the circuit and the heat store and/or the cold store. The charging and discharging of the heat and cold stores thus preferably takes place via heat exchangers that transfer thermal energy into or withdraw thermal energy from these stores.

A latent heat storage medium is preferably located in the heat store and/or in the cold store. Salt hydrates, paraffins, zeolites, etc. can be named by way of example as phase transition materials. The use of sodium acetate trihydrate is particularly preferred.

The present invention is, however, not restricted to this type of storage media. Any desired storage media having an energy density that is as high as possible can be considered that are able to enable a low-loss, long-term storage of heat and cold.

The system can preferably also be used to provide heat and/or cold, e.g. to heat or cool buildings, or to provide heat or cold for processes of any desired kind, directly, i.e. without the use of the energy converter. The same applies accordingly to the storage of heat or cold in the storage units. If e.g. waste heat or cold is produced in a chemical process, it can be fed directly into the heat store or cold store and can be stored there without the energy converter being used for this purpose.

The system has a coupling point for this purpose for a direct use and/or infeed of heat or cold while bypassing the energy converter.

The coupling point is preferably located in the circuit in which the heat transfer medium is located or in which the heat transfer medium flows.

The energy converter can furthermore be connected to an energy source for electrical energy, with the energy source being a photovoltaic system or a wind turbine. This list is of an exemplary nature and is not exclusive.

The energy converter is preferably connected to a power supply system by means of which power is supplied to the energy converter or is fed into the power supply system from said energy converter depending on the operating mode.

The system can be connected to a building or to a plant or can be a component of a building or a plant, with the connection being configured such that the building or the plant can be heated and/or cooled by means of the system and/or can be supplied with electric power, and/or with heat and/or cold and/or electric power being able to be supplied to the system from the building or from the plant. The provision of electrical energy to the building or to the plant and the conversion of electrical energy that is produced in or at the building or at the plant into heat or cold is also conceivable.

A solution is, for example, conceivable in which the building is equipped with a photovoltaic system (also called a PV system in the following) and additionally has a heat store and a cold store. On sufficient solar radiation, electrical energy provided by the PV system is converted into heat and cold and is stored in the stores. If heat or cold is required to heat or cool the building, they can be taken directly from the respective stores. If electrical power is required, for instance for the power supply system of the building, the heat/cold can be converted into electrical power that can be accessed or used in the power supply system of the building.

It is conceivable that exactly one heat store and exactly one cold store are provided. It is also possible and represents a preferred embodiment of the invention that a plurality of heat stores and/or cold stores are present that are selectively controllable via valves or other switching elements.

As already stated above, provision can be made that the energy converter is configured as a heat pump, a thermal generator, a Stirling engine, or a thermoelectric element. This list is not exclusive, but of an exemplary nature.

The present invention relates to a method of converting electrical energy into heat and cold and for converting heat and cold into electrical energy by means of a system in accordance with one of the claims 1 to 13, wherein heat and cold are formed from electrical energy in a first operating mode and electrical energy is generated from heat and cold in a second operating mode.

In this respect, the selection of the operating mode can depend on the demand for and/or on the available amount of heat and/or cold and/or electrical energy.

In the first operating mode, electrical energy can be supplied to the system from an energy source for renewable energy such as from a PV system or a wind turbine.

In the second operating mode, electrical energy is supplied to a building or to a plant.

It is additionally also possible to feed heat and/or cold into the heat store or cold store without using the energy converter or, conversely, to withdraw heat and/or cold from the heat store or cold store to e.g. use it to respectively heat or cool a building.

Advantages of the present invention inter alia comprise lower investment costs in comparison with battery solutions, a long service life (>20 years), a small space requirement, and a low-loss, long-term storage of energy. Apart from this, decentralized solutions can also be implemented by the solution in accordance with the invention that are additionally low maintenance. A decentralized solution is to be understood such that the system can preferably be arranged in a household or in an industrial plant and does not have to be used as a central system that supplies a plurality of households or industrial plants, even though this is likewise not precluded by the present invention.

It must be pointed out at this point that the terms "a" and "one" do not necessarily refer to exactly one of the elements in question, even though this is covered by the invention, but also includes a plurality of these elements. The use of the plural equally also includes the presence of the element in question in the singular and vice versa.

BRIEF DESCRIPTION OF THE DRAWINGS

Further advantages and particulars of the invention will be explained in more detail with reference to an embodiment shown in the drawing.

There are shown:

FIG. 1: a schematic representation of the energy storage system in the first operating mode; and FIG. 2: a schematic representation of the energy storage system in the second operating mode.

DETAILED DESCRIPTION

FIG. 1 shows the system in the first operating mode in which electrical energy is supplied over one or more electrical connections from a photovoltaic system and/or from a wind turbine to the energy converter 2 and in which this energy is stored in the form of heat and cold. Electrical power from waste process heat/cold can also be supplied to the energy converter.

The supplied power is converted in the energy converter into cold energy and heat energy, i.e. into thermal energy, with the heat energy being provided in the hot heat exchanger 4 and the cold energy being provided in the cold heat exchanger 3. As can further be seen from the Figure, these heat exchangers are components of a respective closed circuit that is flowed through by a heat transfer medium that is in turn conveyed by a pump 5, 6.

In the case of the supply of electrical energy to the energy converter 2, the heat or cold supplied in the heat exchangers 3, 4 is taken up by the heat transfer medium that heats up or cools in this process. The heat transfer medium transports the thermal energy to a further heat exchanger that stores the heat or cold in the heat store 1W or in the cold store 1K. The heat or cold is stored there until it is required.

As can further be seen from FIG. 1, two heat stores 1W and two cold stores 1K are respectively provided, with a switching device, preferably one or more valves, via which individual stores or a plurality of stores can be selected, being located between the pump 5, 6 and the stores. to supply them with heat or cold. If a store is charged or discharged, a switch to a further store can be made. It is also conceivable to charge or discharge a plurality of stores simultaneously, if this is required.

Reference numeral 7 designates coupling points that are located in said circuits. At these coupling points 7, heat can be introduced into or withdrawn from the heat store directly, i.e. without using the energy converter, and cold can equally be introduced into or withdrawn from the cold store. This is indicated in FIG. 1 by the term "process heat/process cold".

FIG. 2 shows the procedure of power generation by means of the system in accordance with the invention.

If electrical power is required, the control controls the system such that the stored heat energy and cold energy is conducted from the heat store (1W) and cold store (1K) by means of the pumps 5, 6 to the heat exchangers 3, 4, and indeed by means of the heat transfer medium. The thermal energy is there conducted to the energy converter 2. The latter generates the electrical energy for further use from heat energy and cold energy. The generated electrical energy can be fed into a power supply system (domestic power supply, public power supply) or is otherwise available for owner use in the environment.

The system in accordance with the embodiment can also be used for direct cold use. In this respect, the stored cold energy is conducted from the cold store (1K) to the decoupling unit 7 for cold. The decoupling unit is connected to corresponding cold consumers for processes of any desired kind and, for example, also for building cooling or air conditioning.

The system in accordance with the embodiment can also be used for direct heat use. For this purpose, the pump 6 conveys the stored heat energy by means of the heat transfer medium from the heat store 1W to the decoupling unit 7 for heat. This decoupling unit is connected to corresponding heat consumers for processes or buildings such as for the heating of a building.

The system in accordance with the embodiment can also be used to store external heat and/or cold, e.g. waste process heat, that are produced as surpluses, in the respective storage units 1W, 1K via the decoupling units and the pumps 5, 6. This energy can then be removed in the form of thermal energy or via the power converter in the form of electrical energy.

The storage capacity can be expanded as desired via the valve controls M and can be adapted to the respective applications. A parallel or serial, i.e. following one another in time, charging or discharging of the stores is also possible via the valve controls M.

In this respect, the adaptation to different temperature levels is also possible. Flexible adaptations can thus be carried out, particularly to waste process heat and cold.

The invention claimed is:

1. An energy storage system for storing heat and cold and for providing electrical energy, the system comprising an energy converter, wherein the energy converter is configured to generate electrical energy from heat and cold and to generate heat and cold from electrical energy; wherein the energy converter is in heat exchanging contact with a hot heat exchanger and with a cold heat exchanger; and wherein the hot heat exchanger is connected to a heat store and the cold heat exchanger is connected to a cold store; and wherein a control unit is provided that operates the energy storage system in a first operating mode in which heat and cold are formed from electrical energy by means of the energy converter and in a second operating mode in which electrical energy is generated from heat and cold,
   a plurality of heat stores and cold stores are provided, and a switching device is provided between the plurality of heat stores and cold stores, respectively, for selectively controlling the associated stores so that they can be individually selected for sequential charging or discharging or jointly selected for simultaneous charging or discharging.

2. An energy storage system in accordance with claim 1, wherein a detection unit is provided that is connected to the control unit and that is configured to detect the demand for and/or the available amount of heat and/or cold and/or electrical energy, with the control unit being configured to set the first or second operating mode in dependence on this detection.

3. An energy storage system in accordance with claim 1, wherein the hot heat exchanger and the heat store are components of a closed circuit in which a heat transfer medium is located that can be conveyed in the circuit by a conveying means comprising a pump.

4. An energy storage system in accordance with claim 3, further comprising a heat exchanger for transferring heat or cold located between the circuit and the heat store and/or the cold store.

5. An energy storage system in accordance with claim 3, wherein the cold heat exchanger and the cold store are components of a closed circuit in which a heat transfer medium is located that can be conveyed in the circuit by a conveying means comprising a pump.

6. An energy storage system in accordance with claim 5, wherein a heat storage medium is located in the heat store and/or in the cold store.

7. An energy storage system in accordance with claim 6, wherein a coupling point is provided for a direct withdrawal and/or for a direct infeed of heat or cold from or into the energy storage system while bypassing the energy converter and wherein the coupling point is located in the circuit.

8. An energy storage system in accordance with claim 1, wherein the cold heat exchanger and the cold store are components of a closed circuit in which a heat transfer medium is located that can be conveyed in the circuit by a conveying means comprising a pump.

9. An energy storage system in accordance with claim 1, wherein a heat storage medium comprising a latent heat storage medium, is located in the heat store and/or in the cold store.

10. An energy storage system in accordance with claim 1, wherein a coupling point is provided for a direct withdrawal and/or for a direct infeed of heat or cold from or into the energy storage system while bypassing the energy converter.

11. An energy storage system in accordance with claim 10, wherein the coupling point is located in the circuit.

12. An energy storage system in accordance with claim 1, wherein the energy converter is connected to an energy source for electrical energy, with the energy source being a photovoltaic system or a wind turbine or any other electrical energy source.

13. An energy storage system in accordance with claim 1, wherein the energy converter is connected to a private or to a public power supply system.

14. An energy storage system in accordance with claim 1, wherein the energy storage system is connected to a building or to a plant or is a component of a building or of a plant, with the connection being configured such that the building or the plant can be heated and/or cooled by means of the energy storage system and/or can be supplied with electrical energy, and/or with heat and/or cold and/or electrical energy being able to be supplied to the energy storage system from the building or from the plant.

15. An energy storage system in accordance with claim 1, wherein the plurality of heat stores and cold stores are present that are selectively controllable via valves.

16. An energy storage system in accordance with claim 1, wherein the energy converter is configured as a heat pump, a thermal generator, a Stirling engine, or as a thermoelectric element.

17. A method, comprising:
    converting electrical energy into heat and cold and converting heat and cold into electrical energy by means of an energy storage system in accordance with claim 1, wherein heat and cold are formed from electrical energy in a first operating mode and electrical energy is generated from heat and cold in a second operating mode.

18. A method in accordance with claim 17, wherein the selection of the operating mode depends on the demand for and/or on the available amount of heat and/or cold and/or electrical energy.

19. A method in accordance with claim 17, wherein electrical energy is supplied to the energy storage system from an energy source for renewable energy in the first operating mode.

20. A method in accordance with claim 17, wherein electrical energy is supplied to a building or to a plant from the energy storage system in the second operating mode.

* * * * *